(12) United States Patent
Cashatt et al.

(10) Patent No.: US 9,032,841 B2
(45) Date of Patent: May 19, 2015

(54) TRANSMISSION HOUSING HAVING INTEGRALLY-FORMED WALLS

(75) Inventors: Paul D. Cashatt, Edwards, IL (US); Darryl I. Hudson, Peoria, IL (US); Michael E. Watts, Pekin, IL (US); Cory J. Deppert, Tremont, IL (US); Michael G. Eddingfield, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 392 days.

(21) Appl. No.: 13/459,707

(22) Filed: Apr. 30, 2012

(65) Prior Publication Data

US 2013/0283971 A1 Oct. 31, 2013

(51) Int. Cl.
  *F16H 57/037* (2012.01)
  *F16H 57/03* (2012.01)
  *F16H 57/02* (2012.01)
  *F16H 57/025* (2012.01)

(52) U.S. Cl.
  CPC .............. *F16H 57/03* (2013.01); *Y10T 74/2186* (2015.01); *F16H 2057/02056* (2013.01); *F16H 57/025* (2013.01); *F16H 2057/02013* (2013.01)

(58) Field of Classification Search
  CPC ............ F16H 2057/02091; F16H 2057/02056; F16H 2057/0206; F16H 2057/02043; F16H 2057/02013; F16H 57/025; F16H 57/03
  USPC ......................................................... 74/606 R
  See application file for complete search history.

(56) References Cited

U.S. PATENT DOCUMENTS

| | | | | |
|---|---|---|---|---|
| 6,729,206 | B2 * | 5/2004 | Hayabuchi et al. ......... | 74/606 R |
| 7,695,392 | B2 * | 4/2010 | Isken et al. .................... | 475/230 |
| 2012/0024097 | A1 * | 2/2012 | Strau et al. ...................... | 74/467 |

OTHER PUBLICATIONS

Product brochure AEHQ6553-01 entitled "777G Off-Highway Truck" published in Mar. 2012.

* cited by examiner

*Primary Examiner* — Thomas Diaz

(74) *Attorney, Agent, or Firm* — Finnegan, Henderson, Farabow, Garrett & Dunner, LLP

(57) ABSTRACT

A housing for a transmission is disclosed. The housing may have a plurality of integrally-formed walls that together create an enclosure with an open first end and an open second end disposed axially opposite the first end. The housing may also have a first flange located at the first end of the enclosure and configured to engage an input housing of an engine, and a second flange located at the second end of the enclosure and configured to engage a differential housing. The plurality of integrally formed walls includes a lower wall having at least one impingement protection feature.

29 Claims, 4 Drawing Sheets

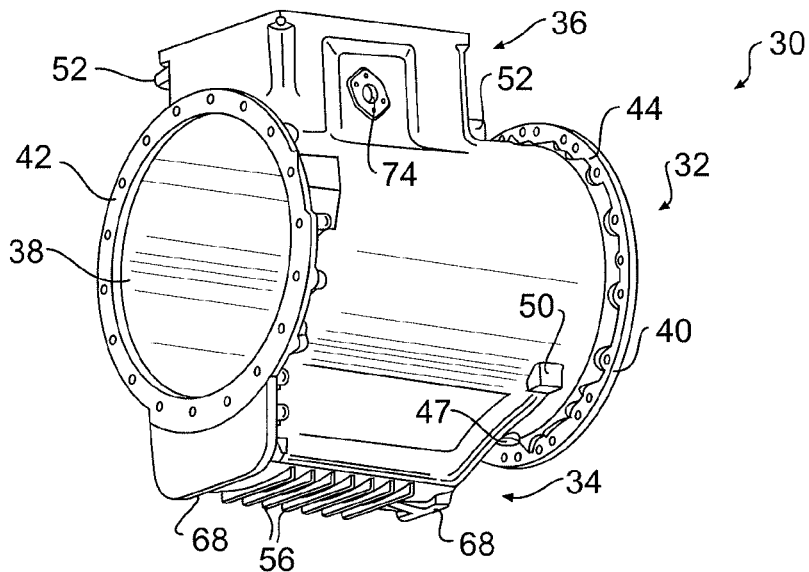
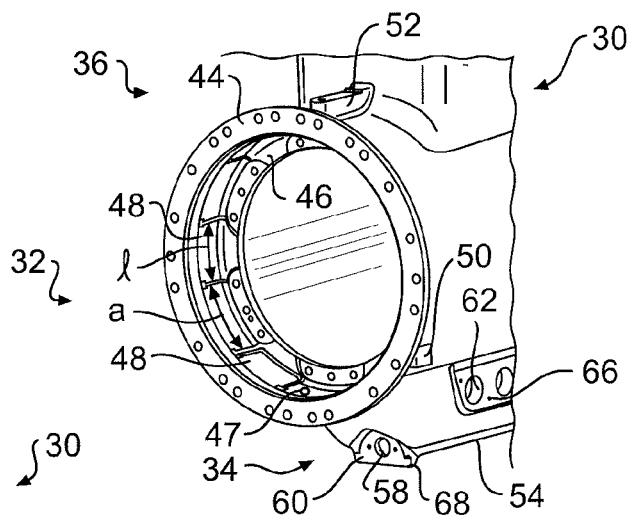
FIG. 3
FIG. 4
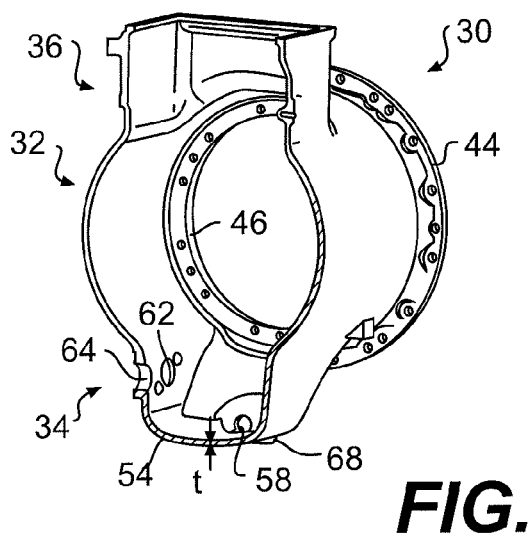
FIG. 5

US 9,032,841 B2

TRANSMISSION HOUSING HAVING INTEGRALLY-FORMED WALLS

TECHNICAL FIELD

The present disclosure relates generally to a transmission housing, and more particularly, to a transmission housing having integrally-formed walls.

BACKGROUND

Machines such as off-highway mining trucks, wheel loaders, and dozers include an engine that provides power to wheels of the machine via a transmission. A typical mechanical or step-change transmission is generally made up of different gears that are rotatingly disposed on one or more different shafts. The different gears can be selectively coupled with each other in different combinations to transmit power from the engine through the shafts to the wheels in a range of different speed versus torque ratios. The combinations of gears that make up the mechanical connection between the engine and wheels can be achieved and changed by way of a one or more hydraulic clutches located within the transmission. A housing is used to contain and protect the gears, shafts, and clutches from the environment.

An exemplary transmission is shown and described on page 7 of a product brochure AEHQ6553-01 titled 777G Off-Highway Truck that was published in March of 2012 ("the '6553 brochure"). In this brochure, the depicted transmission has a housing fabricated from flat metal sheet stock through cutting and welding processes.

Although adequate for many applications, the transmission of the '6553 brochure may be less than optimal. In particular, the housing of this transmission, being a fabricated housing, may be constrained in the types and geometry of available features. For example, this housing may be limited to generally planar walls having a substantially constant thickness. These limitations may provide insufficient protection from debris thrown against the machine by wheels of the machine and/or result in a heavier-than-necessary transmission.

The disclosed transmission housing is directed to overcoming one or more of the problems set forth above and/or other problems of the prior art.

SUMMARY

In one aspect, the present disclosure is directed to a transmission housing. The transmission housing may include a plurality of integrally-formed walls that together create an enclosure with an open first end and an open second end disposed axially opposite the first end. The transmission housing may also include a first flange located at the first end of the enclosure and configured to engage an input housing, and a second flange located at the second end of the enclosure and configured to engage a differential housing. The plurality of integrally formed walls includes a lower wall having at least one impingement protection feature.

In another aspect, the present disclosure is directed to another transmission housing. This transmission housing may include a plurality of integrally-formed walls that together create an enclosure having an open first end and an open second end disposed axially opposite the first end. The transmission housing may also include a first flange located at the first end of the enclosure and configured to engage an input housing, and a second flange located at the second end of the enclosure and configured to engage a differential housing. A portion of the enclosure connecting at least one of the first end with the first flange or the second end with the second flange may have a wall thickness that varies along an annular direction.

BRIEF DESCRIPTION OF THE DRAWINGS

FIGS. 3-5 are pictorial illustrations of an exemplary disclosed housing for the transmission of FIG. 2.

DETAILED DESCRIPTION

Figure 1:
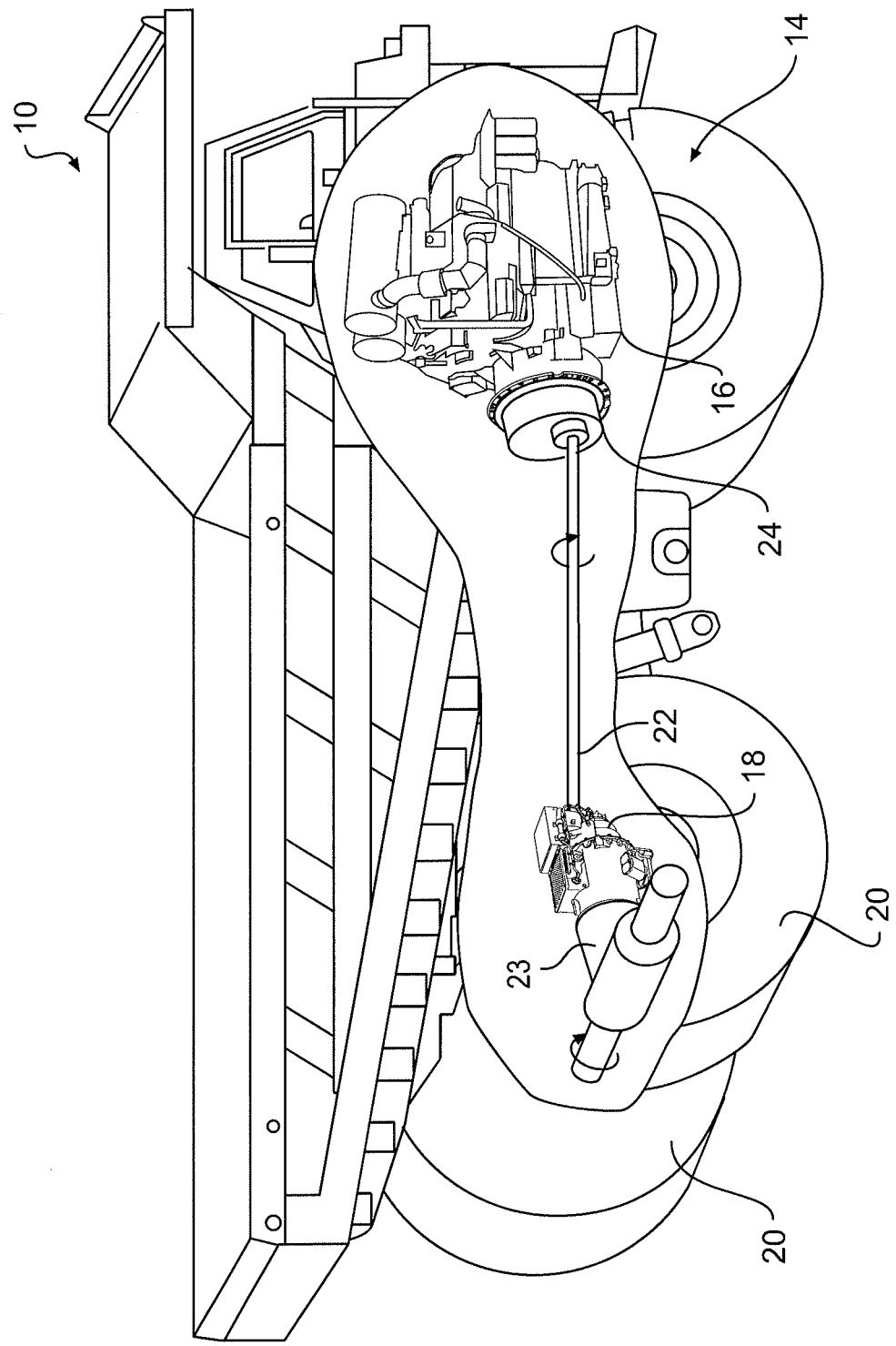
FIG. 1 is a diagrammatic illustration of an exemplary disclosed powertrain.

FIG. 1 illustrates an exemplary mobile machine 10 that may perform a predetermined task at a worksite 12. In the depicted embodiment, machine 10 is an off-highway mining truck. It is contemplated, however, that machine 10 may embody another type of mobile machine such as an articulated haul truck, a wheel loader, a motor grader, or another mobile machine known in the art. Worksite 12 may include, for example, a mine site, a landfill, a quarry, a construction site, or another type of worksite. The predetermined task performed by machine 10 may require machine 10 to generally traverse worksite 12 between different destinations. Accordingly, machine 10 may be provided with a power train 14 that facilitates travel between the destinations of worksite 12.

Power train 14 may generally include an engine 16 and a transmission 18 operatively connected to and driven by engine 16. Engine 16 may embody any type of engine known in the art, for example, a diesel, gasoline, or gaseous-fuel powered, internal combustion engine configured to generate a mechanical power output. Transmission 18 may be, for example, a power-shift transmission that is manually and/or automatically controlled to transmit the mechanical power output of engine 16 to traction devices 20 of machine 10 through a range of different speed vs. torque ratios.

Figure 2:
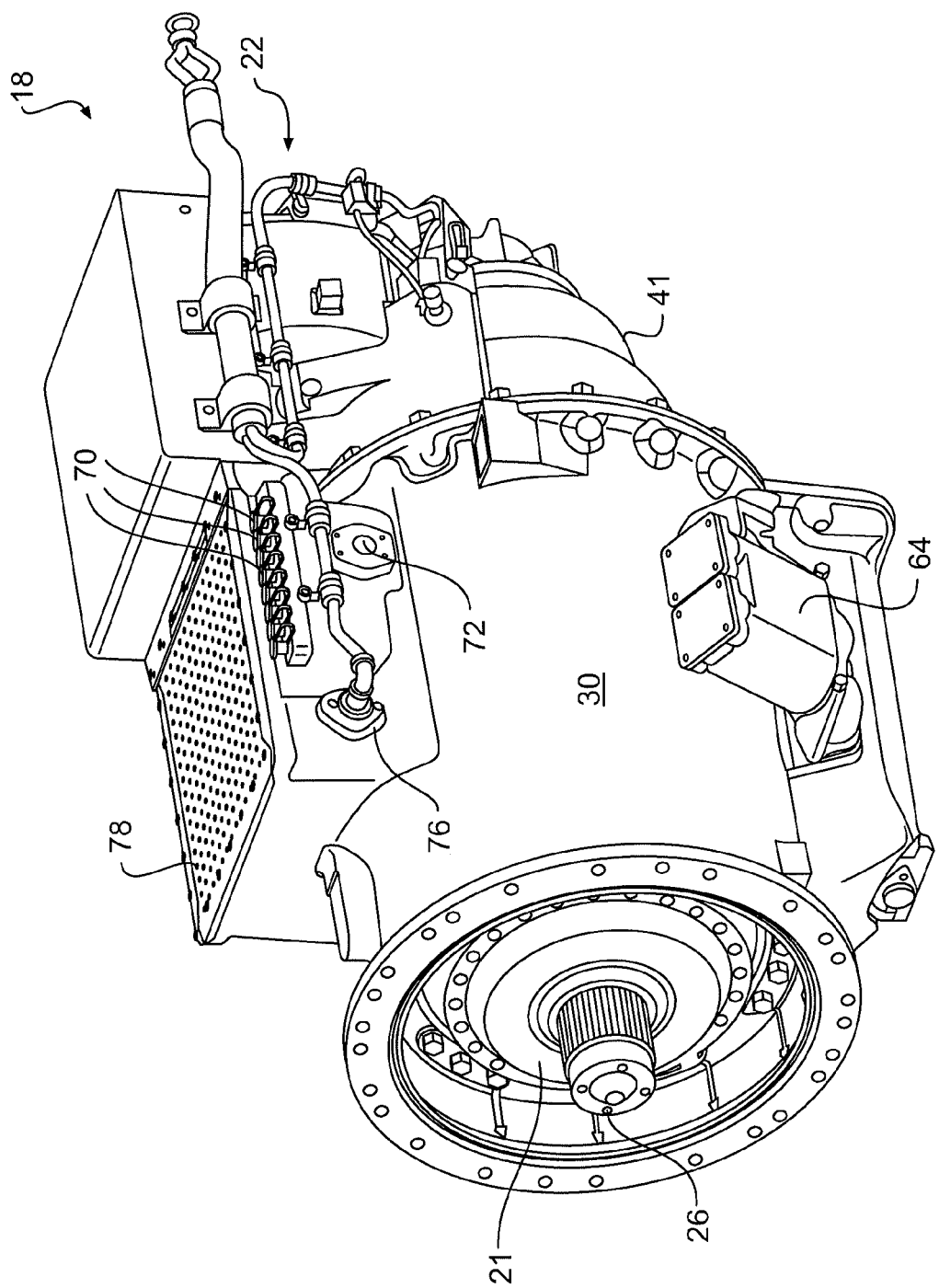
FIG. 2 is a pictorial illustration of an exemplary disclosed transmission that may be used in conjunction with the powertrain of FIG. 1.

FIG. 2 depicts an exemplary embodiment of transmission 18. In this embodiment, transmission 18 is a mechanical step-change transmission used to generate at least one reverse gear ratio and a plurality of forward gear ratios. Each of the different gear ratios may be manually or automatically selected to provide a different ratio of speed-to-torque in either the forward or reverse travel directions. Accordingly, transmission 18 may be an assembly of components including, among other things, a gear train 21 having one more pairs of intermeshing gears (e.g., one or more planetary gear assemblies), one or more clutches (not shown) operable to connect select combinations of the gears together for power transmission, an input member 22 configured to connect the mechanical power output of engine 16 to gear train 21 via a torque converter 24 (shown only in FIG. 1), an output member 26 operatively connecting gear train 21 with a differential 23 (shown only in FIG. 1) and/or final drive of machine 10, and a housing 30 that houses and/or supports the other components of transmission 18.

As shown in FIG. 3, housing 30 may be a single component having a plurality of walls that are integrally formed from ductile iron through a casting process. In particular, housing 30 may include a main portion 32 having a generally cylindrical wall forming an open-ended enclosure, a sump 34 located gravitationally lower than main portion 32, and a control box 36 located opposite sump 34 relative to main portion 32. Torque converter 24 may be connected to an end of main portion 32 opposite differential 23 (referring to FIG. 1), and gear train 21 may be disposed within the enclosure of main portion 32. The control components of transmission 18 (e.g., clutches, valves, sensors, conduits, wiring, etc.) may be at least partially housed within control box 36. Sump 34 may collect return oil that drains from the various components of transmission 18 during normal operations.

Main portion 32 of housing 30 may be generally cylindrical in shape, having an open first end 38 and an open second end 40 located axially opposite first end 38. A first flange 42 may be located at first end 38 and configured to engage a housing of differential 23 (shown only in FIG. 1) of power train 14. A second flange 44 may be located at second end 40 and configured to engage an input housing 41 (shown only in FIG. 2) of power train 14. As shown in FIG. 4, a third flange 46 may be located within the enclosure of main portion 32, between first and second flanges 42, 44, and be configured to engage gear train 21 (referring to FIG. 2) of transmission 18 (e.g., to engage a ring gear, bearing, housing and/or support member of associated planetary gear assemblies). Each of first, second, and third flanges 42-46 may be integrally formed with main portion 32, and have machined faces with a plurality of drillings that facilitate locating and mounting of the associated components. A drain port 47 may be located within main portion 32, between second and third flanges 44, 46 to facilitate draining of oil that pools in this area.

Main portion 32 of housing 30 may have a generally uniform wall thickness, except at locations near flanges 42, 44, and/or 46. For example, the general wall thickness of main portion 32 may be about 12 mm. However, as shown in FIG. 4, the cylindrical wall at first and/or second ends 38, 40 may vary along an annular direction. In particular, the wall at first and/or second ends 38, 40 may have raised annular segments 48 of increased thickness. In one exemplary embodiment, segments 48 may be about 30-35% thicker than the remaining wall of main portion 32 (e.g., about 16 mm). An arc length l of segments 48 may be less than an arc length a of the thinner walls located in-between adjacent segments 48 (i.e., segments 48 may consume a minor portion of the periphery of main portion 32). Segments 48, having the thicker wall, may increase a strength of main portion 32 at first and/or second ends 38, while the segments having the thinner wall between segments 48 may help to maintain a low weight of housing 30.

A plurality of support features may be formed within an external surface of main portion 32. For example, a machining location feature 50 may be formed in the external surface of main portion 32 and used during a machine process to locate a machine tool (not shown) relative to housing 30. In the disclosed embodiment of FIGS. 3-5, machining location feature 50 is a generally rectangular protrusion located at a lower half of main portion 32, closer to second end 40 than to first end 38. In this same embodiment, one or more lifting features 52 may be formed in the external surface of main portion 32 and used to lift housing 30 and/or the entire transmission 18 during manufacturing, assembly, and/or maintenance. In the disclosed embodiment, lifting features 52 may be machined and bored protrusions (e.g., bosses) located at a upper side of main portion 32, near second end 40 and configured to receive lifting hardware (e.g., eyebolts). It is contemplated that any number and type of machining location features 50 and/or lifting features 52 may be utilized and positioned at any convenient location on housing 30.

Sump 34 may be a generally rectangular structure that is open to an interior of main portion 32 along a length direction. Because of its location below main portion 32, sump 34 may be closer to and more prone to damage caused by the environment (i.e., damage caused by debris thrown into the air by traction devices 20 and/or by collision with roadway obstructions). For this reason, sump 34 may be provided with one or more impingement protection features configured to mitigate damage caused by the debris and obstructions.

In the disclosed embodiment, sump 34 includes two different impingement protection features, although only one of these features may be utilized within a single housing 30, if desired. As shown in FIGS. 3 and 5, these features may include one or more sacrificial ribs 56 formed within a floor 54 of sump 34 (see FIG. 3) and an increased wall thickness t in floor 54 (see FIG. 5). Ribs 56 may be elongated protrusions that extend downward from floor 54. In the disclosed embodiment, seven spaced apart ribs 56 are included and oriented in a generally transverse direction (i.e., generally transverse relative to a center axis of main portion 32). It is contemplated however, that a greater or lesser number of ribs 56 may be included and/or oriented differently (e.g., aligned in a lengthwise direction of main portion 32), if desired. Ribs 56 may intended to break away from sump 34 during a collision with debris or obstacles, thereby dissipating some of the associated impact energy to reduce stress on floor 54. Although located external to sump 34, it is contemplated that ribs 56 could additionally or alternatively be located inside of sump 34, if desired, to primarily function as strengthening mechanisms for floor 54. The wall thickness t of floor 54 may be about 15-20% greater than the general thickness of the remaining walls of housing 30. In the disclosed embodiment, the wall thickness of floor 54 may be about 14 mm. This thickness may increase a resistance of sump 34 to cracking or puncture when impacted.

Sump 34 may also be provided with one or more support features that provide functionality to sump 34. For example, sump 34 may include one or more drain ports 58 and an associated mounting flange 60 configured to accommodate a drain pipe (not shown). Drain port 58 may be located anywhere within sump 34 such as at a leading end, a trailing end (shown in FIGS. 2, 4, an 5), or about midway between the leading and trailing ends. In addition, one or more supply ports 62 may be located within a sidewall of sump 34, and a mounting face 66 may be located at supply ports 62 to facilitate connection to and operation of an associated filter 64 (shown only in FIG. 2) and/or scavenge pump (not shown) through which fluid passes from sump 34. One or more internal conduits (not shown) may be disposed within sump 34 that extend from supply ports 62 to a lower-most area within sump 34, if desired. Further, one or more transversely-arranged stability pads 68 may be positioned at leading and trailing ends of sump 34. Stability pads 68 may help to reduce unintended rotation of housing 30 during the manufacturing and/or assembly processes. It is contemplated that stability pads 68 could also or alternatively be integrally connected to main portion 32, if desired.

Control box 36 may also be open to the interior of main portion 32, and configured to house the control components associated with transmission 18. Control box 36 may include, for example, at least one of a pressure tap 70 (shown only in FIG. 2) associated with each clutch of transmission 18, a hydraulic control inlet port 72 (shown only in FIG. 2), a hydraulic control outlet port 74 (shown only in FIG. 3), and one or more wire harness ports 76 (shown only in FIG. 2) located in a side of control box 36. A mounting face may be associated with these ports to facilitate connection with external conduits, sensors, harnesses, etc. One or more lifting features 52 (described above—see FIG. 3) may be associated with an upper lip of control box 36, if desired. A plate 78 (referring to FIG. 2) may be used to close off a top of control box 36.

Figure 6:
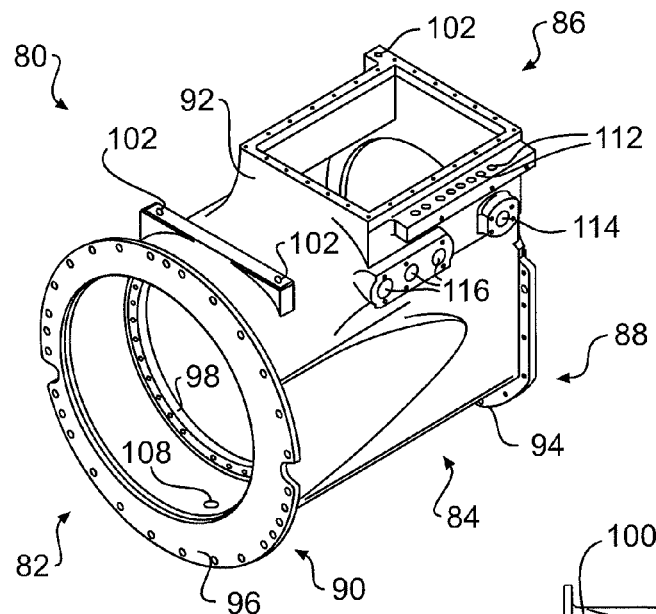
FIGS. 6-8 are pictorial illustrations of another exemplary disclosed housing for the transmission of FIG. 2.
Figure 7:
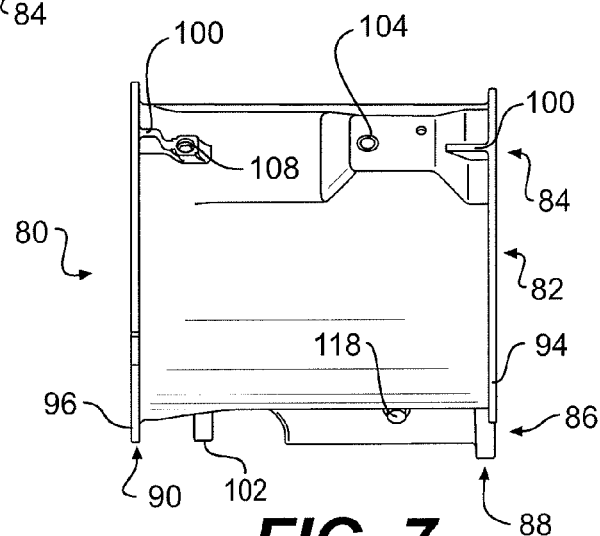
Figure 8:
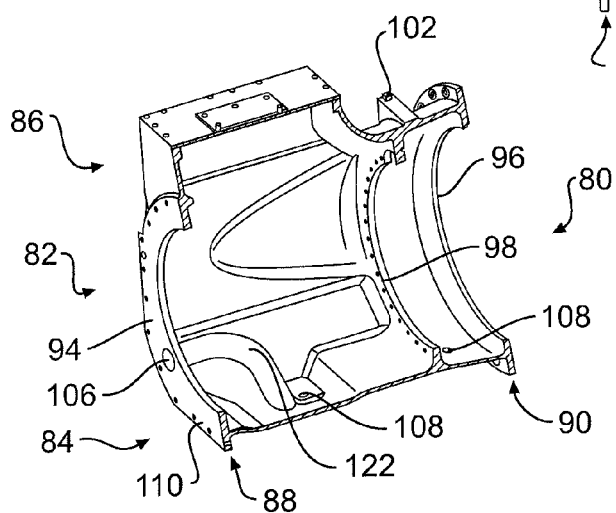

An alternative transmission housing 80 is shown in FIGS. 6-8. Similar to housing 30 of FIGS. 3-5, housing 80 of FIGS. 6-8 may include a main portion 82, a sump 84, and a control box 86 all cast as a single integral component from ductile iron. However, in contrast to main portion 32 of FIGS. 3-5, main portion 82 may not be as cylindrical as main portion 32. In particular, main portion 82 may be generally square at an open first end 88 and gradually transition to a generally cylindrical shape at an open second end 90. This geometry may accommodate varying space constraints between different models of machines 10. In addition, a transition area 92 consisting of a relatively large blend radius may join a trailing end of control box 86 with an external surface of main portion 82. In the disclosed embodiment, this blend radius may extend from main portion 82 up to a distal lip of control box 86 and provide for improved strength in this area.

Housing 80 may include features similar to many of the features of housing 30. In particular, housing 80 may include, among other things, a first flange 94, a second flange 96, a third flange 98, machining location features 100, lifting features 102, one or more impingement protection features (not shown), a supply port 106, one or more drain ports 108, stability pads 110, pressure taps 112, a control inlet port 114, one or more control outlet ports 116, a diagnostic port 118, an internal scavenge conduit 122, etc.

Some of these features, however, may have a slightly different configuration. For example, a lower portion of first flange 94, being generally square, may function as the stability pad for housing 80. Machining location features 100 may be located at a bottom side of main portion 82. Lifting features 102 may include two features 102 located near second end 90 and one feature 102 located at a distal corner of control box 86. Scavenge conduit 122 may terminate within first flange 94. It is contemplated that other variations of these features would be known to those skilled in the art.

INDUSTRIAL APPLICABILITY

The housing of the present disclosure has potential application in any mobile machine equipped with a transmission. The disclosed transmission housing may provide for a variety of available features. For example, because the disclosed housing may be a cast housing, integral walls of the housing may not be limited in shape or size. That is, the disclosed housing may have cylindrical surfaces, surfaces that transition between cylindrical and prismatic shapes, and walls with varying thicknesses. This variability may allow for a lightweight, strong housing that can be adaptable to changing space constraints imposed by different machine models and applications. In addition, the cast nature of the disclosed housing may allow for increased protection against debris and obstacles encountered by the machine. For example, the disclosed housing may include integral impingement protection features, such as increased wall thickness in only critical areas and/or sacrificial features that reduces stresses on the housing by breaking away under impact.

It will be apparent to those skilled in the art that various modifications and variations can be made to the transmission housing of the present disclosure without departing from the scope of the disclosure. Other embodiments will be apparent to those skilled in the art from consideration of the specification and practice of the transmission housing disclosed herein. It is intended that the specification and examples be considered as exemplary only, with a true scope of the disclosure being indicated by the following claims and their equivalents.

What is claimed is:

1. A transmission housing, comprising:
a one-piece component including:
a plurality of integrally-formed walls that together create an enclosure having a main portion with an open first end and an open second end disposed axially opposite the first end, the enclosure further including a sump connected to a gravitationally lower side of the main portion;
a first flange located at the first end of the enclosure and configured to engage an input housing; and
a second flange located at the second end of the enclosure and configured to engage a differential housing,
wherein the plurality of integrally formed walls includes a lower wall of the sump having at least one impingement protection feature, the at least one impingement protection feature including a lower wall thickness of the sump being greater than a thickness of the plurality of integrally-formed walls forming the main potion.

2. The transmission housing of claim 1, wherein the lower wall thickness of the sump is about 15-20% greater than the thickness of the plurality of integrally formed walls forming the main portion.

3. The transmission housing of claim 1, wherein the at least one impingement protection feature further includes at least one sacrificial rib formed on the lower wall of the sump and extending away from the enclosure created by the plurality of integrally formed walls forming the main portion.

4. The transmission housing of claim 1, wherein the main portion is generally cylindrical.

5. The transmission housing of claim 4, wherein the sump is generally rectangular and includes at least one drain port.

6. The transmission housing of claim 1, wherein the enclosure further includes a control box disposed opposite the sump relative to the main portion.

7. The transmission housing of claim 6, further including a transition radius connecting the main portion with a distal edge of the control box.

8. The transmission housing of claim 6, further including at least one of a clutch pressure tap, a hydraulic control inlet, a hydraulic control outlet, and a diagnostic port located in a side of the control box.

9. The transmission housing of claim 1, further including a scavenge tube having a first end operatively connected with the sump and a second end operatively connected to the first flange.

10. The transmission housing of claim 1, wherein the plurality of integrally formed walls are formed from a ductile iron material through a casting process.

11. The transmission housing of claim 1, wherein an end of the main portion connecting at least one of the first end with the first flange or the second end with the second flange has a wall thickness that varies along an annular direction.

12. The transmission housing of claim 11, wherein an arc length of an annular portion of the main portion having a thicker wall is less than an arc length of an adjacent annular portion of the main portion, having a thinner wall.

13. The transmission housing of claim 11, wherein the wall thickness varies by about 30-35% of the at least one of the first and second ends.

14. The transmission housing of claim 1, further including at least one boss integrally formed with the plurality of integrally formed walls at a location opposite the lower wall and configured to receive lifting hardware.

15. The transmission housing of claim 14, wherein the at least one boss includes at least three bosses integrally formed within the plurality of integrally formed walls.

16. The transmission housing of claim 1, further including at least one machining locating feature integrally formed with the enclosure and at least one of the first and second flanges.

17. The transmission housing of claim 1, further including at least one stability pad integrally formed at a lower side of the enclosure and configured to inhibit rotation of the transmission housing.

18. The transmission housing of claim 17, wherein the at least one stability pad includes two stability pads spaced apart from each other in an axial direction of the enclosure.

19. The transmission housing of claim 1, further including a third flange located within the enclosure and configured to engage a planetary gear assembly.

20. A transmission housing, comprising:
a one-piece component including:
a plurality of integrally-formed walls that together create an enclosure having an open first end and an open second end disposed axially opposite the first end;
a first flange located at the first end of the enclosure and configured to engage an input housing; and
a second flange located at the second end of the enclosure and configured to engage a differential housing,
wherein a portion of the enclosure connecting at least one of the first end with the first flange or the second end with the second flange has a wall thickness that varies along an annular direction, and
wherein, in the portion of the enclosure having a varying wall thickness, annular portions having a thicker wall are alternately disposed with annular portions having a thinner wall.

21. The transmission housing of claim 20, wherein the enclosure includes:
a generally cylindrical main portion including the portion of the enclosure having the varying wall thickness;
a generally rectangular sump located gravitationally below the main portion and including at least one drain port; and
a control box disposed opposite the sump relative to the main portion.

22. The transmission housing of claim 21, further including a transition radius connecting the main portion with a distal edge of the control box.

23. The transmission housing of claim 21, further including at least one of a clutch pressure tap, a hydraulic control inlet, a hydraulic control outlet, and a diagnostic port located in a side of the control box.

24. The transmission housing of claim 21, further including a scavenge tube having a first end operatively connected with the sump and a second end operatively connected to the first flange.

25. The transmission housing of claim 20, wherein the plurality of integrally formed walls are formed from a ductile iron material through a casting process.

26. The transmission housing of claim 20, wherein an arc length of the annular portion having the thicker wall is less than an arc length of each adjacent annular portion having the thinner wall.

27. The transmission housing of claim 20, wherein the wall thickness varies by about 30-35% of the at least one of the first and second ends.

28. The transmission housing of claim 20, further including a third flange located within the enclosure and configured to engage a planetary gear assembly.

29. A transmission housing, comprising:
a plurality of walls integrally formed from a ductile iron material through a casting process that together create an enclosure having a main portion with an open first end and an open second end disposed axially opposite the first end, a sump connected to a gravitationally lower side of the main portion, and a control box disposed opposite the sump relative to the main portion;
a first flange located at the first end of the enclosure and configured to engage an input housing; and
a second flange located at the second end of the enclosure and configured to engage a differential housing; and
a third flange located within the enclosure between the first and second flanges and configured to engage a planetary gear assembly,
wherein:
a lower wall thickness of the sump is greater than a thickness of the plurality of walls forming the main portion; and
an end of the main portion connecting at least one of the first end with the first flange or the second end with the second flange has a wall thickness that varies along an annular direction.

* * * * *